US011683008B2

(12) United States Patent
Wang et al.

(10) Patent No.: US 11,683,008 B2
(45) Date of Patent: Jun. 20, 2023

(54) PHOTOVOLTAIC INVERTER, PHOTOVOLTAIC SYSTEM, AND METHOD FOR CONTROLLING DISCHARGING

(71) Applicant: Sungrow Power Supply Co., Ltd., Hefei (CN)

(72) Inventors: Xinyu Wang, Anhui (CN); Anying Jiang, Anhui (CN); Shun Ding, Anhui (CN); Yanfei Yu, Anhui (CN); Xiaoxun Li, Anhui (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 0 days.

(21) Appl. No.: 17/380,418

(22) Filed: Jul. 20, 2021

(65) Prior Publication Data

US 2022/0029582 A1 Jan. 27, 2022

(30) Foreign Application Priority Data

Jul. 22, 2020 (CN) .......................... 202010711947.9

(51) Int. Cl.
*H02S 40/32* (2014.01)
*H02M 1/32* (2007.01)
*H02M 1/00* (2006.01)

(52) U.S. Cl.
CPC ............. *H02S 40/32* (2014.12); *H02M 1/007* (2021.05); *H02M 1/322* (2021.05)

(58) Field of Classification Search
CPC .... H02M 1/007; H02M 1/0077; H02M 1/008; H02M 1/0083; H02S 40/32; H02S 40/34; H02S 40/36; H02S 40/38
See application file for complete search history.

(56) References Cited

U.S. PATENT DOCUMENTS

2012/0120694 A1\* 5/2012 Tsuchiya ........... H01L 31/02021
363/131
2017/0302082 A1 10/2017 Weng et al.
2017/0373201 A1\* 12/2017 Macerini ................. H02S 40/34

FOREIGN PATENT DOCUMENTS

CN 203399068 U 1/2014
CN 208078657 U 11/2018
(Continued)

OTHER PUBLICATIONS

Extended European Search Report for European Application No. 21186188.5, dated Dec. 13, 2021.
(Continued)

*Primary Examiner* — Nguyen Tran
(74) *Attorney, Agent, or Firm* — Wolf, Greenfield & Sacks, P.C.

(57) ABSTRACT

A photovoltaic inverter, a photovoltaic system, and a method for controlling discharging are provided. The photovoltaic inverter includes a first DCDC converter, an inverter circuit, a first discharging circuit, and a controller. A port capacitor is connected between a positive input end and a negative input end of the first DCDC converter. The port capacitor includes an X capacitor and a first group of Y capacitors. The first discharging circuit is connected between a common terminal of the first group of Y capacitors and a direct current bus, where the common terminal of the first group of Y capacitors is grounded. The controller is configured to control, when receiving a rapid shutdown instruction, the first discharging circuit to operate. The first discharging circuit is configured to discharge electrical energy of the port capacitor.

15 Claims, 8 Drawing Sheets

(56) References Cited

FOREIGN PATENT DOCUMENTS

| | | |
|---|---|---|
| CN | 110212744 A | 9/2019 |
| CN | 110855170 A | 2/2020 |
| CN | 110912389 A | 3/2020 |
| EP | 3 261 207 A1 | 12/2017 |
| WO | WO 2019/121405 A1 | 6/2019 |

OTHER PUBLICATIONS

Second Office Action for Chinese Application No. 202010711947.7, dated Jan. 4, 2022.

* cited by examiner

PHOTOVOLTAIC INVERTER, PHOTOVOLTAIC SYSTEM, AND METHOD FOR CONTROLLING DISCHARGING

The present application claims priority to Chinese Patent Application No. 202010711947.9, titled "PHOTOVOLTAIC INVERTER, PHOTOVOLTAIC SYSTEM, AND METHOD FOR CONTROLLING DISCHARGING", filed on Jul. 22, 2020 with the China National Intellectual Property Administration, which is incorporated herein by reference in its entirety.

FIELD

The present disclosure relates to the technical field of photovoltaic power generation, and in particular to a photovoltaic inverter, a photovoltaic system, and a method for controlling discharging.

BACKGROUND

A photovoltaic system is required to be shut down rapidly sometimes. The rapid shutdown system part of the standard UL1741-2018 stipulates that in order to ensure safety of maintenance personnel, when a rapid shutdown instruction is received, a voltage between any direct current input conductors and a voltage of any direct current input conductor of the grid-connected inverter is required to be reduced to below 30V within 30 s.

In order to achieve the above goals, in the existing solution, a direct current bus is provided with a passive discharging circuit. Specifically, a direct current bus capacitor actively discharges electrical energy through an auxiliary power supply or an inverter switch transistor. When a voltage across the direct current bus capacitor is insufficient to meet the voltage requirements of the auxiliary power supply, the passive discharging circuit discharges electrical energy from the direct current bus capacitor.

In the existing solution, the direct current bus capacitor directly discharges electrical energy. However, since capacitance of the direct current bus capacitor is usually relatively large, and the passive discharging circuit usually includes a discharge resistor with a relatively small resistance. In order to reduce the voltage to below 30V within 30 s, discharging power of the discharging resistor is large, resulting in a large volume of the inverter, thereby increasing the cost of the photovoltaic system.

SUMMARY

A photovoltaic inverter, a photovoltaic system, and a method for controlling discharging are provided according to embodiments of the present disclosure. The photovoltaic inverter includes a discharging circuit with a relatively small volume, so that a volume of the photovoltaic inverter is reduced.

A photovoltaic inverter is provided according to an embodiment of the present disclosure. The photovoltaic inverter includes a first direct current to direct current (DCDC) converter, an inverter circuit, a first discharging circuit, and a controller. The first DCDC converter is connected to a photovoltaic array at an input side of first DCDC converter, and is connected to an input side of the inverter circuit at an output side of the first DCDC converter. A port capacitor is connected between a positive input end and a negative input end of the first DCDC converter. The port capacitor includes an X capacitor and a first group of Y capacitors. The first discharging circuit is connected between a common terminal of the first group of Y capacitors and a direct current bus, where the common terminal of the first group of Y capacitors is grounded. The controller is configured to control, when receiving a rapid shutdown instruction, the first discharging circuit to operate. The first discharging circuit is configured to discharge electrical energy of the port capacitor.

In an embodiment, the first DCDC converter and the inverter circuit are in a common negative connection. A second group of Y capacitors are connected between a positive input end and a negative input end of the inverter circuit, where a common terminal of the second group of Y capacitors is grounded. The first discharging circuit is further configured to discharge electrical energy of the second group of Y capacitors.

In an embodiment, the first discharging circuit includes an insulation resistance detection circuit.

In an embodiment, the insulation resistance detection circuit is connected between the common terminal of the second group of Y capacitors and the direct current bus. The insulation resistance detection circuit includes a first resistor, a second resistor, a third resistor, and a first controllable switch. A first terminal of the first resistor is connected to the positive input end of the inverter circuit, and a second terminal of the first resistor is connected to the negative input end of the inverter circuit via the second resistor. A first terminal of the second resistor is connected to the second terminal of the first resistor, and a second terminal of the second resistor is connected to the negative input end of the inverter circuit. A first terminal of the third resistor is connected to the second terminal of the first resistor, and a second terminal of the third resistor is connected to the common terminal of the second group of Y capacitors. The controller is configured to control the first controllable switch to be closed to activate the insulation resistance detection circuit to discharge electrical energy of the first group of Y capacitors and the second group of Y capacitors.

In an embodiment, the first discharging circuit further includes a branch including a fourth resistor and a second controllable switch. A first terminal of the fourth resistor is connected to the common terminal of the second group of Y capacitors, and a second terminal of the fourth resistor is connected to the negative input end of the inverter circuit via the second controllable switch. The controller is further configured to control the second controllable switch to be closed, where the branch is configured to discharge electrical energy of the first group of Y capacitors and the second group of Y capacitors.

In an embodiment, the first discharging circuit includes a fourth resistor and a second controllable switch. A first terminal of the fourth resistor is connected to the common terminal of the second group of Y capacitors, and a second terminal of the fourth resistor is connected to the negative input end of the inverter circuit via the second controllable switch. The controller is configured to control the second controllable switch to be closed to activate the first discharging circuit.

In an embodiment, the photovoltaic inverter further includes a second DCDC converter. The second DCDC converter is a non-isolated DCDC converter. A third group of Y capacitors is connected between a positive input end and a negative input end of the second DCDC converter, and a common terminal of the third group of Y capacitors is grounded. A fourth group of Y capacitors is connected between a positive output end and a negative output end of the second DCDC converter, and a common terminal of the fourth group of Y capacitors is grounded. The positive output end of the second DCDC converter is connected to the positive input end of the inverter circuit, and the negative output end of the second DCDC converter is connected to the negative input end of the inverter circuit. The first discharging circuit is further configured to discharge electrical energy of the third group of Y capacitors and the fourth group of Y capacitors.

In an embodiment, the photovoltaic inverter further includes a second DCDC converter and a second discharging circuit. The second DCDC converter is an isolated DCDC converter. A third group of Y capacitors is connected between a positive input end and a negative input end of the second DCDC converter, and a common terminal of the third group of Y capacitors is grounded. A fourth group of Y capacitors is connected between a positive output end and a negative output end of the second DCDC converter, and a common terminal of the fourth group of Y capacitors is grounded. The positive output end of the second DCDC converter is connected to the positive input end of the inverter circuit, and the negative output end of the second DCDC converter is connected to the negative input end of the inverter circuit. The second discharging circuit is connected between the common terminal of the third group of Y capacitors and the negative input end of the second DCDC converter. the controller is further configured to control, when receiving the rapid shutdown instruction, the second discharging circuit to operate, so as to discharge electrical energy of the third group of Y capacitors.

In an embodiment, the first DCDC converter and the inverter circuit are in a common positive connection. A second group of Y capacitors are connected between a positive input end and a negative input end of the inverter circuit, where a common terminal of the second group of Y capacitors is grounded. The first discharging circuit is further configured to discharge electrical energy of the second group of Y capacitors.

In an embodiment, the first discharging circuit includes an insulation resistance detection circuit.

In an embodiment, the insulation resistance detection circuit includes a first resistor, a second resistor, a third resistor, and a first controllable switch. A first terminal of the first resistor is connected to the positive input end of the inverter circuit, and a second terminal of the first resistor is connected to the negative input end of the inverter circuit via the second resistor. The first controllable switch is connected in parallel with the first resistor. A first terminal of the third resistor is connected to the second terminal of the first resistor, and a second terminal of the third resistor is connected to the common terminal of the second group of Y capacitors. The controller is configured to control the first controllable switch to be closed to activate the insulation resistance detection circuit to discharge electrical energy of the first group of Y capacitors and the second group of Y capacitors.

In an embodiment, the first discharging circuit further includes a branch including a fourth resistor and a second controllable switch. A first terminal of the fourth resistor is connected to the common terminal of the second group of Y capacitors, and a second terminal of the fourth resistor is connected to the negative input end of the inverter circuit via the second controllable switch. The controller is further configured to control the second controllable switch to be closed, where the branch is configured to discharge electrical energy of the first group of Y capacitors and the second group of Y capacitors.

In an embodiment, the first discharging circuit includes a fourth resistor and a second controllable switch. A first terminal of the fourth resistor is connected to the common terminal of the second group of Y capacitors, and a second terminal of the fourth resistor is connected to the negative input end of the inverter circuit via the second controllable switch. The controller is configured to control the second controllable switch to be closed to activate the first discharging circuit.

In an embodiment, the photovoltaic inverter further includes a second DCDC converter. The second DCDC converter is a non-isolated DCDC converter. A third group of Y capacitors is connected between a positive input end and a negative input end of the second DCDC converter, and a common terminal of the third group of Y capacitors is grounded. A fourth group of Y capacitors is connected between a positive output end and a negative output end of the second DCDC converter, and a common terminal of the fourth group of Y capacitors is grounded. The positive output end of the second DCDC converter is connected to the positive input end of the inverter circuit, and the negative output end of the second DCDC converter is connected to the negative input end of the inverter circuit. The first discharging circuit is further configured to discharge electrical energy of the third group of Y capacitors and the fourth group of Y capacitors.

In an embodiment, the photovoltaic inverter further includes a second DCDC converter and a second discharging circuit. The second DCDC converter is an isolated DCDC converter. A third group of Y capacitors is connected between a positive input end and a negative input end of the second DCDC converter, and a common terminal of the third group of Y capacitors is grounded. A fourth group of Y capacitors is connected between a positive output end and a negative output end of the second DCDC converter, and a common terminal of the fourth group of Y capacitors is grounded. The positive output end of the second DCDC converter is connected to the positive input end of the inverter circuit, and the negative output end of the second DCDC converter is connected to the negative input end of the inverter circuit. The second discharging circuit is connected between the common terminal of the third group of Y capacitors and the negative input end of the second DCDC converter. The controller is further configured to control, when receiving the rapid shutdown instruction, the second discharging circuit to operate, so as to discharge electrical energy of the third group of Y capacitors.

A photovoltaic system is provided according to the present disclosure. The photovoltaic system includes the photovoltaic inverter and a photovoltaic array. The photovoltaic inverter is connected to an output side of the photovoltaic array at an input side of the photovoltaic inverter. The photovoltaic inverter is configured to convert direct current electricity outputted by the photovoltaic array into alternating current electricity and output the alternating current electricity.

A method for controlling discharging is provided according to an embodiment of the present disclosure. The method is performed by the above photovoltaic inverter. The method includes: controlling, when receiving a rapid shutdown instruction, the first discharging circuit to operate to discharge electrical energy of the port capacitor.

It can be seen from the above technical solutions that, the present disclosure has the following advantages. In order to shut down the photovoltaic inverter rapidly, the photovoltaic inverter discharges electrical energy of a Y capacitor whose capacitance is much smaller than that of a direct current bus capacitor. The capacitance of the discharging capacitor is small, and the time constant is proportional to RC, where R is the resistance of the discharging resistor, and C is the capacitance of the discharging capacitor. Therefore, for a certain time constant, small capacitance corresponds to a large resistance. Further, a large resistance of a resistor corresponds to a small volume of the resistor. Therefore, in the solution of the present disclosure, since the discharging capacitor has the small capacitance, the volume of the discharging circuit is reduced compared with that in the existing solution. In the existing solution, electrical energy of the direct current bus capacitor is discharged.

DETAILED DESCRIPTION OF EMBODIMENTS

Technical terms are first introduced below, so that those skilled in the art to can better implement the technical solutions of the present disclosure.

The photovoltaic inverter according to the present disclosure includes a DCDC converter and an inverter circuit. The DCDC converter is a boost converter, a buck converter, or a buck-boost converter, which is not limited in the present disclosure. For example, in a case that the DCDC converter is a boost converter, the DCDC converter is implemented by a boost circuit.

X and Y capacitors are safety capacitors, which are technical terms in the field. Generally, the X capacitor is connected across a power line (that is, in line to line connection or line to neural connection), and is a metal film capacitor. The Y capacitor is connected between a power line and the ground (that is, in line to ground connection or neutral to ground connection). The Y capacitor is generally used in pairs. The X capacitor is for suppressing symmetrical interference, and the Y capacitor is for suppressing asymmetrical interference.

A photovoltaic inverter is provided according to an embodiment of the present disclosure. When the photovoltaic power generation system is shut down rapidly, the Y capacitor with capacitance much smaller than a direct current bus capacitor discharges electrical energy. The time constant is equal to a product of resistance and the capacitance, i.e. $\tau=RC$, where R is the resistance of a discharging resistor and C is the capacitance of a discharging capacitor. Therefore, for a certain time constant, small capacitance corresponds to a large resistance. Further, a large resistance of a resistor corresponds to a small volume of the resistor. Therefore, in the solution of this embodiment, since the discharging capacitor has the small capacitance, the volume of the discharging circuit is reduced compared with that in the existing solution, thereby reducing cost of the photovoltaic system.

Embodiments of the present disclosure are described in detail below with reference to the accompanying drawings, so that the above objects, features, and advantages of the present disclosure are easily comprehensible.

Figure 1:
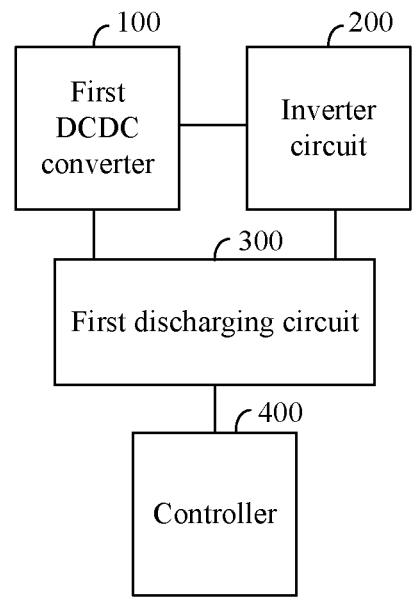
FIG. 1 is a schematic structural diagram of a photovoltaic inverter according to an embodiment of the present disclosure.

Reference is made to FIG. 1, which is a schematic structural diagram of a photovoltaic inverter according to an embodiment of the present disclosure.

The photovoltaic inverter in this embodiment includes an inverter circuit and a DCDC converter, and is described in detail below.

The photovoltaic inverter according to the embodiment of the present disclosure includes a first DCDC converter 100, an inverter circuit 200, a first discharging circuit 300 and a controller 400.

An output side of the first DCDC converter 100 is connected to an input side of the inverter circuit 200.

The first discharging circuit 300 is connected to the first DCDC converter 100 and/or the inverter circuit 200.

An input side of the first DCDC converter 100 is connected to a photovoltaic array that generates electrical energy, and the output side of the first DCDC converter 100 is connected to the input side of the inverter circuit 200. The output side of the inverter circuit 200 is connected to a power grid or an off-grid load.

In the embodiment of the present disclosure, a port capacitor is connected between a positive input end and a negative input end of the first DCDC converter 100. The port capacitor includes an X capacitor and a first group of Y capacitors. The first discharging circuit is connected between a common terminal of the first group of Y capacitors and a direct current bus, and the common terminal of the first group of Y capacitors is grounded. Since the Y capacitor is generally used in pairs, the first group of Y capacitors includes two Y capacitors for example. The two Y capacitors are connected in series between the positive input end and the negative input end of the first DCDC converter 100, and a common terminal of the two Y capacitors is grounded.

Specifically, the first discharging circuit 300 is connected between the common terminal of the first group of Y capacitors and the direct current bus.

The controller 400 is configured to control, when receiving a rapid shutdown instruction, the first discharging circuit to operate, so that the first discharging circuit discharges electrical energy of the port capacitor.

The rapid shutdown instruction includes an external instruction signal (for example, from a master controller of a photovoltaic power generation station), a grid shutdown signal, and other signals, which are not limited here.

It should be noted that in another embodiment of the present disclosure, a second group of Y capacitors are connected between a positive input end and a negative input end of the inverter circuit 200. A common terminal of the second group of Y capacitors is grounded. In this case, the first DCDC converter and the inverter circuit are in a common positive connection or a common negative connection. Therefore, the first group of Y capacitors and the second group of Y capacitors are also in a common positive connection or a common negative connection. When discharging electrical energy of the first group of Y capacitors, the first discharging circuit 300 indirectly discharges electrical energy of the second group of Y capacitors.

In the embodiment of the present disclosure, the first discharging circuit 300 is configured to discharge electrical energy of the first group of Y capacitors in a fast shutdown process. In the embodiment of the present disclosure, electrical energy of the Y capacitor, whose capacitance is much smaller than that of the direct current bus capacitor, is discharged. The capacitance of the discharging capacitor is small, and the time constant is proportional to RC, where R is the resistance of a discharging resistor, and C is the capacitance of a discharging capacitor. Therefore, for a certain time constant, small capacitance corresponds to a large resistance. Further, a large resistance of a resistor corresponds to a small volume of the resistor. Therefore, in the solution of this embodiment, since the discharging capacitor has the small capacitance, the volume of the discharging circuit is reduced compared with that in the existing solution.

The first DCDC converter 100 and the inverter circuit 200 are in a common positive connection or a common negative connection. An example in which the first DCDC converter 100 and the inverter circuit 200 are in a common negative connection is described below.

Figure 2:
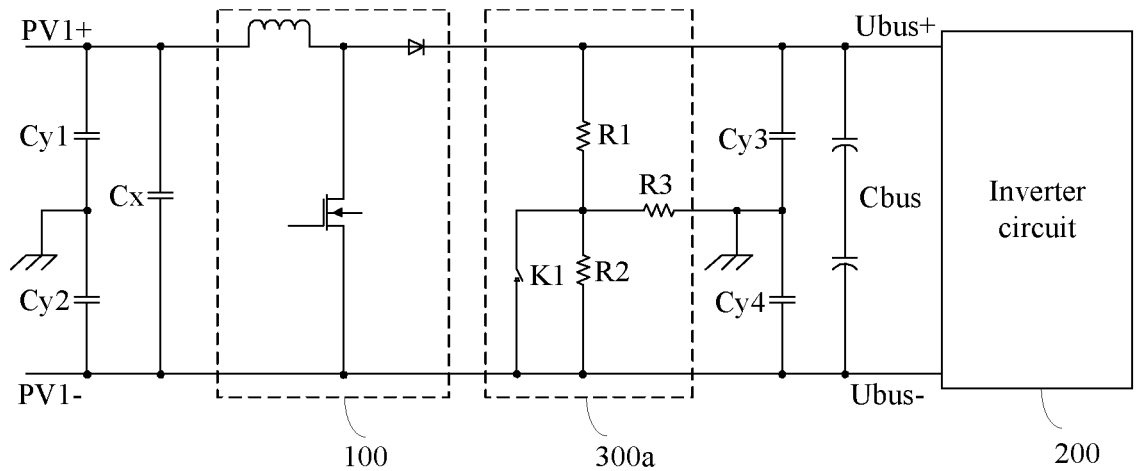
FIG. 2 is a circuit diagram of a photovoltaic inverter in a common negative connection according to an embodiment of the present disclosure.

In some embodiments, as shown in FIG. 2, in the photovoltaic inverter, the first DCDC converter 100 and the inverter circuit 200 are in a common negative connection.

Since a photovoltaic inverter is required to detect an insulation resistance to ground of a photovoltaic string connected to the photovoltaic inverter before grid connection, some photovoltaic inverters include an insulation resistance detection circuit. In this case, the insulation resistance detection circuit doubles as a first discharging circuit to discharge electrical energy of the Y capacitor in the photovoltaic inverter. Therefore, the photovoltaic inverter includes no additional discharging circuit, which further reduce the volume and the cost of the photovoltaic inverter. An application scenario in which the photovoltaic inverter includes an insulation resistance detection circuit and the insulation resistance detection circuit doubles as the first discharging circuit to discharge electrical energy of the Y capacitor is described below.

Reference is made to FIG. 2, which is a circuit diagram of a photovoltaic inverter in a common negative connection according to an embodiment of the present disclosure.

In this embodiment, a second group of Y capacitors (Cy3 and Cy4) are connected between a positive input end and a negative input end of the inverter circuit 200, and a common terminal of the second group of Y capacitors (Cy3 and Cy4) is grounded.

The first discharging circuit 300a discharges electrical energy of the first group of Y capacitors (Cy1 and Cy2), and electrical energy of the second group of Y capacitors (Cy3 and Cy4).

In this embodiment, the first discharging circuit 300a is an insulation resistance detection circuit, and is connected between the common terminal of the second group of Y capacitors (Cy3 and Cy4) and the direct current bus.

As shown in FIG. 2, capacitors Cy3 and Cy4 are connected in series between the positive input end and the negative input end of the inverter circuit 200 (that is, between a positive direct current bus and a negative direct current bus). The first terminal of the capacitor Cy3 is connected to the positive input end of the inverter circuit 200. The second terminal of capacitor Cy3 is connected to the negative input end of the inverter circuit 200 via the capacitor Cy4. A common terminal of capacitors Cy3 and Cy4 is grounded. It can also be seen from FIG. 2 that the photovoltaic inverter further includes a direct current bus capacitor Cbus. Generally, the number of the direct current bus capacitor is 2. In the existing solution, the discharging circuit discharges electrical energy of the direct current bus capacitor Cbus rather than the Y capacitor.

In this embodiment, only one implementation of the insulation resistance detection circuit is described. The process of insulation resistance detection is relatively mature. The insulation resistance is obtained based on electrical parameters measured before and after the switch K1 is closed. However, how to detect the insulation resistance is not involved herein, and therefore is not described in detail herein. Only a process of discharging performed by the insulation resistance detection circuit is described herein.

The insulation resistance detection circuit includes a first resistor R1, a second resistor R2, a third resistor R3, and a first controllable switch K1.

A first terminal of the first resistor R1 is connected to the positive input end of the inverter circuit 200. A second terminal of the first resistor R1 is connected to the negative input end of the inverter circuit 200 via the second resistor R2.

A first terminal of the second resistor R2 is connected to the second terminal of the first resistor R1, and a second terminal of the second resistor R2 is connected to the negative input end of the inverter circuit 200.

A first terminal of the third resistor R3 is connected to the second terminal of the first resistor R1, and a second terminal of the third resistor R3 is connected to the common terminal of the second group of Y capacitors (Cy3 and Cy4).

It should be understood that Y capacitors (Cy1 and Cy2) and an X capacitor Cx1 are connected between the positive and negative input ends of the first DCDC converter. The common terminal of the capacitors Cy1 and Cy2 is grounded.

In consideration of electromagnetic compatibility (EMC), Y capacitors (Cy3 and Cy4) are connected between the positive and negative input ends of the inverter circuit 200, and a common terminal of the capacitors Cy3 and Cy4 is grounded. In practice, capacitance of the Y capacitor is smaller than that of the X capacitor, and much smaller than that of the direct current bus capacitor. For example, the capacitance of the Y capacitor is at an nF level, capacitance of the X capacitor is at a uF level, and capacitance of the direct current bus capacitor is at a mF level.

The controller 400 is configured to control the first controllable switch K1 to be closed, so that the insulation resistance detection circuit 300 discharges electrical energy of the first group of Y capacitors (Cy1 and Cy2) and the capacitor Cy4 in the second group of Y capacitors.

Specifically, the capacitor Cy4, the third resistor R3 and the first controllable switch K1 form a closed loop, so that electrical energy of the capacitor Cy4 is discharged through the closed loop. One terminal of the capacitor Cy2 is connected to the capacitor Cy4, and the other terminal of the capacitor Cy2 is grounded. Further, one terminal of the capacitor Cy4 is connected to the capacitor Cy2, and the other terminal of the capacitor Cy4 is grounded. Therefore, the capacitor Cy2 is equivalent to being connected in parallel with the capacitor Cy4, so that electrical energy of the capacitor Cy2 is discharged through a closed loop formed by the capacitor Cy2, the third resistor R3 and the first controllable switch K1. One terminal of the capacitor Cy1 is connected to PV+, and the other terminal of the capacitor Cy1 is grounded and connected to PV− through the third resistor R3, to form a closed loop, so that electrical energy of the capacitor Cy1 is discharged.

It can be seen that in this embodiment, the insulation resistance circuit doubles as a first discharging circuit 300 to discharge the electrical energy of the Y capacitor at a PV port, such that a voltage between conductors and a voltage across a conductor are quickly decreased to below 30V. After electrical energy of the Y capacitors Cy2 and Cy4 (which are equivalent in parallel) is discharged, a voltage across the capacitor Cy3 approximates to a bus voltage. Since the first DCDC converter 100 is capable of reverse blocking, the capacitor Cy3 cannot charge the capacitor Cy1. Therefore, by discharging electrical energy of capacitors Cy1, Cy2, and Cy4, the voltage at a PV port is lowered quickly.

Since the capacitance of the X capacitor and the capacitance of the Y capacitor are much smaller than the capacitance of the direct current bus capacitor, an equivalent resistance is relatively large while reducing a voltage to below a certain voltage within a certain time period. For the X capacitor Cx1, a pulse driving signal is sent to control a switch in the first DCDC converter 100 to discharge electrical energy of the X capacitor Cx1. Electrical energy of the Y capacitor is discharged through a resistor in the insulation resistance detection circuit (generally, resistances of the resistors R1, R2, R3 in the insulation resistance detection circuit are at a MΩ level, and a discharging resistance for the direct current bus capacitor is at a kΩ level). It can be seen that the discharging resistance in the solutions according to the present disclosure is much larger than that in the existing solution. Therefore, the volume of the discharging circuit is reduced.

In this embodiment, in order to reduce the voltage of the photovoltaic inverter in a common negative connection to a certain voltage within a certain time period, an insulation resistance detection circuit in the photovoltaic inverter doubles as a first discharging circuit 300a to discharge electrical energy of a Y capacitor whose capacitance is much smaller than that of the direct current bus capacitor, without an additional discharging circuit, thereby reducing the cost of the photovoltaic inverter.

Figure 3:
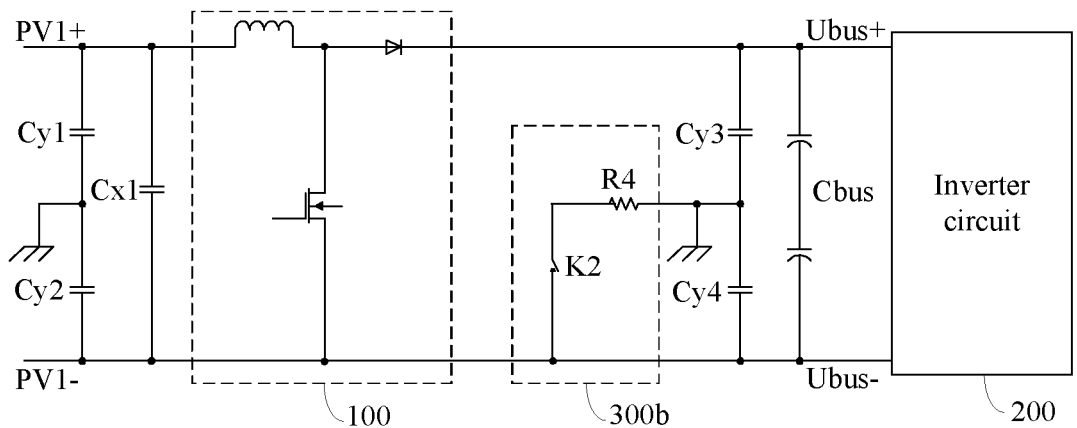
FIG. 3 is a circuit diagram of a photovoltaic inverter in a common negative connection according to another embodiment of the present disclosure.

In another embodiment, the photovoltaic inverter includes a first discharging circuit 300b, as shown in FIG. 3. The first discharging circuit 300b includes at least a fourth resistor R4 and a second controllable switch K2.

Reference is made to FIG. 3, which is a circuit diagram of a photovoltaic inverter in a common negative connection according to another embodiment of the present disclosure.

A first terminal of the fourth resistor R4 is connected to a common terminal of a second group of Y capacitors (Cy3 and Cy4). A second terminal of the fourth resistor R4 is connected to the negative input end of the inverter circuit 200 via the second controllable switch K2.

The controller 400 is configured to control the second controllable switch K1 to be closed, so that the first discharging circuit 300b operates.

Specifically, the capacitor Cy4, the fourth resistor R4 and the second controllable switch K2 form a closed loop, so that the electrical energy of the capacitor Cy4 is discharged. One terminal of the capacitor Cy2 is connected to the capacitor Cy4, and the other terminal of the capacitor Cy2 is grounded. Further, one terminal of the capacitor Cy4 is connected to the capacitor Cy2, and the other terminal of the capacitor Cy4 is grounded. Therefore, the capacitor Cy2 is equivalent to being connected in parallel with the capacitor Cy4, so that electrical energy of the capacitor Cy2 is discharged through a closed loop formed by the capacitor Cy2, the fourth resistor R4 and the second controllable switch K2. One terminal of the capacitor Cy1 is connected to PV+, and the other terminal of the capacitor Cy1 is grounded and connected to PV− through the fourth resistor R4, to form a closed loop, so that electrical energy of the capacitor Cy1 is discharged.

It can be seen that in this embodiment, in order to reduce the voltage of the photovoltaic inverter to a certain voltage within a certain time period, a discharging circuit including the fourth resistor R4 and the second controllable switch K2 is added to discharge electrical energy of the first group of Y capacitors (Cy1 and Cy2) and the capacitor Cy4 in the second group of Y capacitors. Since capacitance of the Y capacitor is much smaller than that of the direct current bus capacitor, a resistance of the fourth resistor R4 is relatively large (generally, at a MΩ level), and is much larger than the discharging resistance (which is generally at a kΩ level) for the direct current bus capacitor.

In this embodiment, in order to reduce the voltage of the photovoltaic inverter in a common negative connection to a certain voltage within a certain time period, for the photovoltaic inverter in a common negative connection, a discharging circuit including the fourth resistor R4 and the second controllable switch K2 is added to discharge electrical energy of a Y capacitor whose capacitance is much smaller than that of the direct current bus capacitor. Time constant is proportional to RC, where R is the resistance of the discharging resistor, and C is the capacitance of the discharging capacitor. Therefore, for a certain time constant, small capacitance corresponds to a large resistance (of the fourth resistor R4). Further, a resistor with a large resistance has a small volume. Therefore, in this embodiment, the volume of the discharging circuit is reduced and the cost of the photovoltaic system is reduced.

Figure 4:
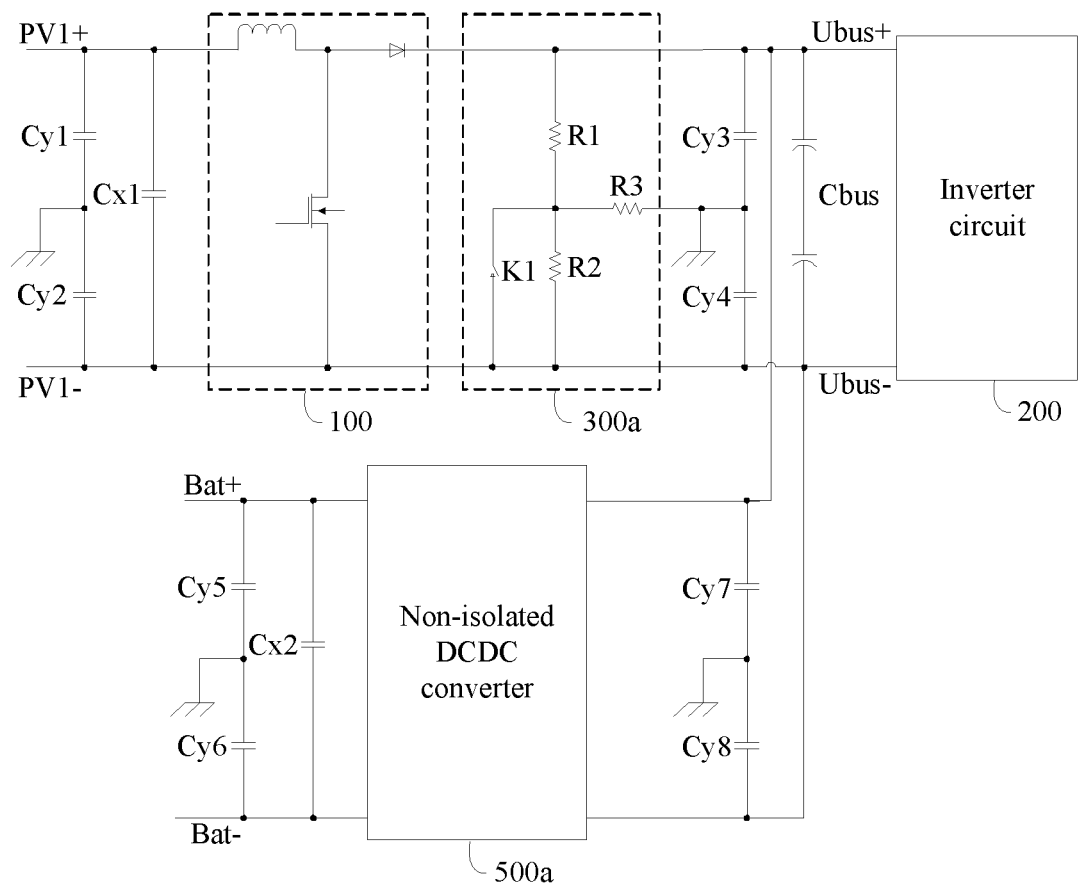
FIG. 4 is a circuit diagram of a photovoltaic inverter including a non-isolated direct current to direct current (DCDC) converter in a common negative connection according to an embodiment of the present disclosure.

In another embodiment, as shown in FIG. 4, the photovoltaic inverter further includes a second DCDC converter 500a. In practice, an input side (that is, a Bat port) of the second DCDC converter 500a is connected to a photovoltaic energy storage device, that is, a device for storing electrical energy in a photovoltaic system.

The second DCDC converter is a non-isolated DCDC converter or an isolated DCDC converter, depending on application scenarios. An application scenario where the second DCDC converter is a non-isolated DCDC converter is described below.

Reference is made to FIG. 4, which is a circuit diagram of a photovoltaic inverter including a non-isolated DCDC converter in a common negative connection according to an embodiment of the present disclosure.

The photovoltaic inverter in this embodiment further includes a second DCDC converter 500a, which is a non-isolated DCDC converter. An insulation resistance detection circuit doubles as the first discharging circuit 300a.

A third group of Y capacitors (Cy5 and Cy6) are connected between a positive input end and a negative input end of the second DCDC converter 500a. A fourth group of Y capacitors (Cy7 and Cy8) are connected between a positive output end and a negative output end of the second DCDC converter 500a.

A common terminal of the third group of Y capacitors (Cy5 and Cy6) is grounded. A common terminal of the fourth group of Y capacitors (Cy7 and Cy8) is grounded.

The positive output end of the second DCDC converter 500a is connected to the positive input end of the inverter circuit 200. The negative output end of the second DCDC converter 500a is connected to the negative input end of the inverter circuit.

It should be understood that Y capacitors (Cy5 and Cy6) and an X capacitor Cx2 are connected between the positive and negative input ends of the second DCDC converter. The common terminal of the capacitors Cy5 and Cy6 is grounded.

In consideration of EMC, Y capacitors (Cy7 and Cy8) are connected between positive and negative output ends of the second DCDC converter. A common terminal of the capacitors Cy7 and Cy8 is grounded. In practice, capacitance of the Y capacitor is smaller than that of the X capacitor, and much smaller than that of the direct current bus capacitor. For example, capacitance of the Y capacitor is at an nF level, capacitance of the X capacitor is at a uF level, and capacitance of the direct current bus capacitor is at a mF level. The Y capacitors (Cy5, Cy6, Cy7, and Cy8) and the X capacitors (Cx2) connected between the input and output ends of the second DCDC converter each have much smaller capacitance than the direct current bus capacitor Cbus.

The first discharging circuit 300a is further configured to discharge electrical energy of the third group of Y capacitors (Cy5 and Cy6) and the capacitor Cy8 in the fourth group of Y capacitors.

In this embodiment, an insulation resistance detection circuit doubles as the second discharging circuit 600 to discharge electrical energy of a Y capacitor at the Bat port, such that a voltage between conductors and a voltage across a conductor are quickly decreased to below 30V. After electrical energy of the Y capacitors Cy6 and Cy8 (which are equivalent in parallel) is discharged, a voltage across the capacitor Cy7 approximates to a bus voltage. Since the second DCDC converter 500a is capable of reverse blocking, the capacitor Cy7 cannot charge the capacitor Cy5. Therefore, by discharging electrical energy of capacitors Cy5, Cy6, and Cy8, the voltage at a Bat port is lowered quickly.

Specifically, the capacitor Cy8, the third resistor R3 and the first controllable switch K1 form a closed loop, so that electrical energy of the capacitor Cy8 is discharged through the closed loop. One terminal of the capacitor Cy6 is connected to the capacitor Cy8, and the other terminal of the capacitor Cy6 is grounded. Further, one terminal of the capacitor Cy8 is connected to the capacitor Cy6, and the other terminal of the capacitor Cy8 is grounded. Therefore, the capacitor Cy6 is equivalent to being connected in parallel with the capacitor Cy8, so that electrical energy of the capacitor Cy6 is discharged through a closed loop formed by the capacitor Cy6, the third resistor R3 and the first controllable switch K1. One terminal of the capacitor Cy5 is connected to Bat+, and the other terminal of the capacitor Cy5 is grounded and connected to Bat− through the third resistor R3, to form a closed loop, so that electrical energy of the capacitor Cy5 is discharged.

Since the capacitance of the X capacitor and the capacitance of the Y capacitor are much smaller than the capacitance of the direct current bus capacitor, an equivalent resistance is relatively large while reducing a voltage to below a certain voltage within a certain time period. For the X capacitor Cx2, a pulse driving signal is sent to control a switch in the second DCDC converter 500a to discharge electrical energy of the X capacitor Cx1. Electrical energy of the Y capacitor is discharged through a resistor in the insulation resistance detection circuit (generally, resistances of the resistors R1, R2, R3 in the insulation resistance detection circuit are at a MΩ level). It can be seen that the discharging resistance in the solutions according to the present disclosure is much larger than that in the existing solution. Therefore, the volume of the discharging circuit is reduced.

In this embodiment, in order to reduce the voltage of the photovoltaic inverter in a common negative connection to a certain voltage within a certain time period, an insulation resistance detection circuit in the photovoltaic inverter doubles as a first discharging circuit 300a to discharge electrical energy of the first group of Y capacitors at the input side of the first DCDC inverter 100, the second group of Y capacitors at the output side of the first DCDC inverter 100, the third group of Y capacitors at the input side of the second DCDC inverter 500a, and the fourth group of Y capacitors at the output side of the second DCDC inverter 500a, without an additional discharging circuit, thereby reducing the cost of the photovoltaic inverter.

Figure 5:
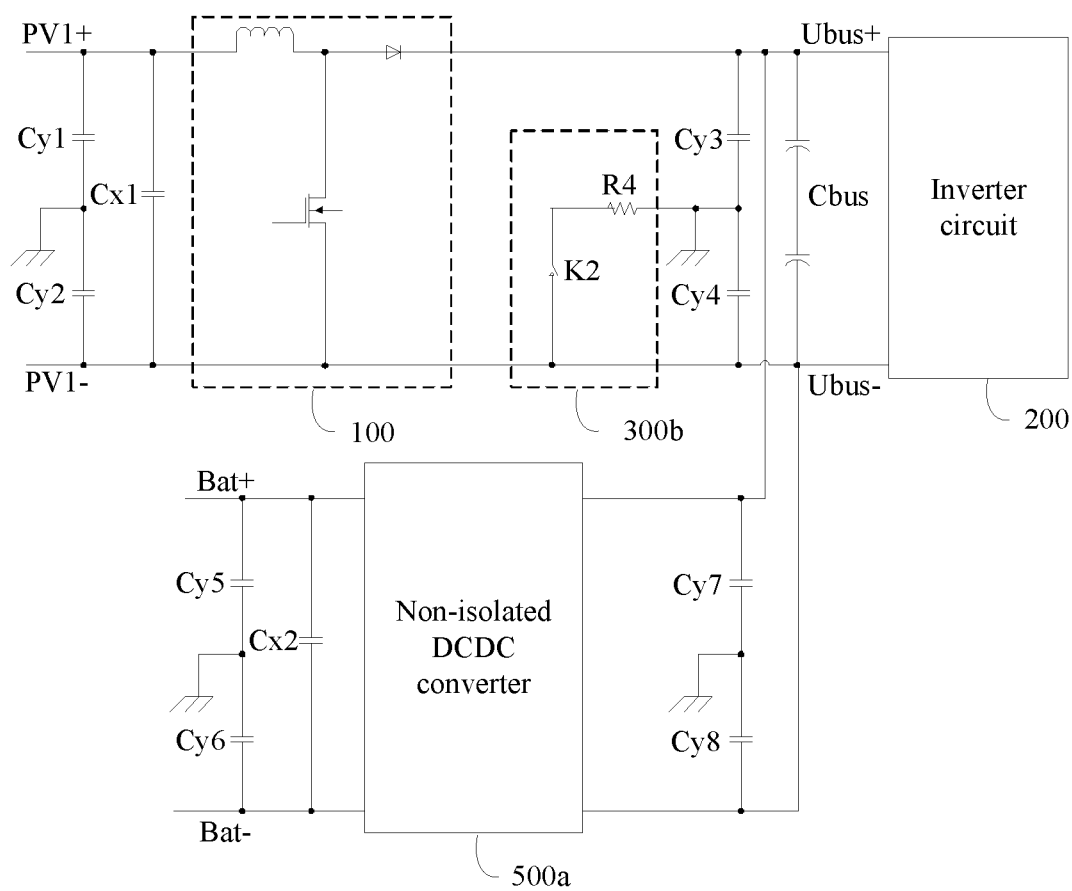
FIG. 5 is a circuit diagram of a photovoltaic inverter including a non-isolated DCDC converter in a common negative connection according to another embodiment of the present disclosure.

Reference is made to FIG. 5, which is a circuit diagram of a photovoltaic inverter including a non-isolated DCDC converter in a common negative connection according to another embodiment of the present disclosure.

In the photovoltaic inverter according to this embodiment, a second DCDC converter 500a is a non-isolated DCDC converter. A first discharging circuit 300b includes a fourth resistor R4 and a second controllable switch K2.

A first terminal of the fourth resistor R4 is connected to the common terminal of the second group of Y capacitors (Cy3 and Cy4). A second terminal of the fourth resistor R4 is connected to the negative input end of the inverter circuit 200 via the second controllable switch K2.

The controller 400 is configured to control the second controllable switch K2 to be closed, so that the first discharging circuit 300b operates.

Specifically, the capacitor Cy8, the fourth resistor R4 and the second controllable switch K2 form a closed loop, so that the electrical energy of the capacitor Cy8 is discharged. One terminal of the capacitor Cy6 is connected to the capacitor Cy8, and the other terminal of the capacitor Cy6 is grounded. Further, one terminal of the capacitor Cy8 is connected to the capacitor Cy6, and the other terminal of the capacitor Cy8 is grounded. Therefore, the capacitor Cy6 is equivalent to being connected in parallel with the capacitor Cy4, so that electrical energy of the capacitor Cy6 is discharged through a closed loop formed by the capacitor Cy6, the fourth resistor R4 and the second controllable switch K2. One terminal of the capacitor Cy5 is connected to Bat+, and the other terminal of the capacitor Cy5 is grounded and connected to Bat− through the fourth resistor R4, to form a closed loop, so that electrical energy of the capacitor Cy5 is discharged.

In this embodiment, in order to reduce the voltage of the photovoltaic inverter in a common negative connection to a certain voltage within a certain time period, a discharging circuit including the fourth resistor R4 and the second controllable switch K2 is added to discharge electrical energy of the first group of Y capacitors at the input side of the first DCDC inverter 100, the second group of Y capacitors at the output side of the first DCDC inverter 100, the third group of Y capacitors at the input side of the second DCDC inverter 500a, and the fourth group of Y capacitors at the output side of the second DCDC inverter 500a. Capacitance of the Y capacitor is much smaller than that of the direct current bus capacitor. Time constant is proportional to RC, where R is the resistance of the discharging resistor, and C is the capacitance of the discharging capacitor. Therefore, for a certain time constant, small capacitance corresponds to a large resistance (of the fourth resistor R4). Further, a resistor with a large resistance has a small volume. Therefore, in this embodiment, the volume of the discharging circuit is reduced and the cost of the photovoltaic system is reduced.

Figure 6:
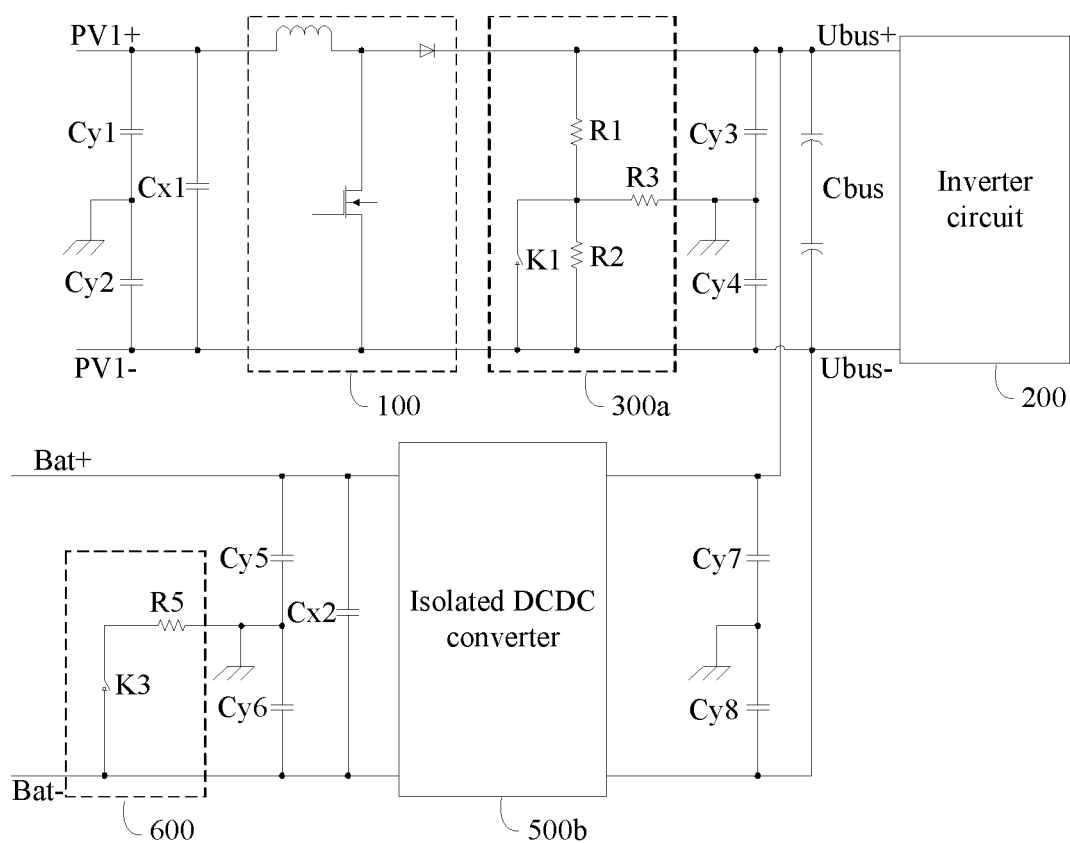
FIG. 6 is a circuit diagram of a photovoltaic inverter including an isolated DCDC converter in a common negative connection according to another embodiment of the present disclosure.

In another embodiment, as shown in FIG. 6, the provided photovoltaic includes a second DCDC converter, which is an isolated DCDC converter.

Reference is made to FIG. 6, which is a circuit diagram of a photovoltaic inverter including an isolated DCDC converter in a common negative connection according to another embodiment of the present disclosure.

In this embodiment, the photovoltaic inverter further includes a second DCDC converter 500b and a second discharging circuit 600. The second DCDC converter 500b is an isolated DCDC converter.

A third group of Y capacitors (Cy5 and Cy6) are connected between a positive input end and a negative input end of the second DCDC converter 500b. A fourth group of Y capacitors (Cy7 and Cy8) are connected between a positive output end and a negative output end of the second DCDC converter 500b.

A common terminal of the third group of Y capacitors (Cy5 and Cy6) is grounded. A common terminal of the fourth group of Y capacitors (Cy7 and Cy8) is grounded.

The positive output end of the second DCDC converter 500b is connected to the positive input end of the inverter circuit 200. The negative output end of the second DCDC converter 500b is connected to the negative input end of the inverter circuit.

The second discharging circuit 600 is connected between the common terminal of the third group of Y capacitors (Cy5 and Cy6) and the negative input end of the second DCDC converter 500b.

The controller 400 is further configured to control, when receiving a rapid shutdown instruction, the second discharging circuit 600 to operate, so that the second discharging circuit 600 discharges electrical energy of the third group of Y capacitors (Cy5 and Cy6).

It should be understood that in this embodiment, the Y capacitor at the input side of the second DCDC converter 500b is disconnected from the first discharging circuit 300a due to the isolated DCDC converter 500b, a second discharging circuit 600 is added to discharge the electrical energy of the third group of Y capacitors (Cy5 and Cy6).

In this embodiment, since connection between the Y capacitor at the input side of the second DCDC converter 500b and the first discharging circuit 300a is cut off by the isolated DCDC converter 500b, the second discharging circuit 600 is added at the input side of the second DCDC converter 500b, so as to discharge the electrical energy of the third group of Y capacitors (Cy5 and Cy6). Therefore, in a case of an isolated DCDC converter, a voltage between conductors and a voltage across a conductor are quickly decreased without discharging the electrical energy of the direct current bus capacitor with a large capacitance. In this case, power of the discharging resistor is small, so that the volume of the discharging circuit is reduced, and the cost of the photovoltaic inverter is reduced.

In another embodiment, the photovoltaic inverter includes a first discharging circuit 300b. The first discharging circuit 300b includes a fourth resistor R4 and a second controllable switch K2.

Figure 7:
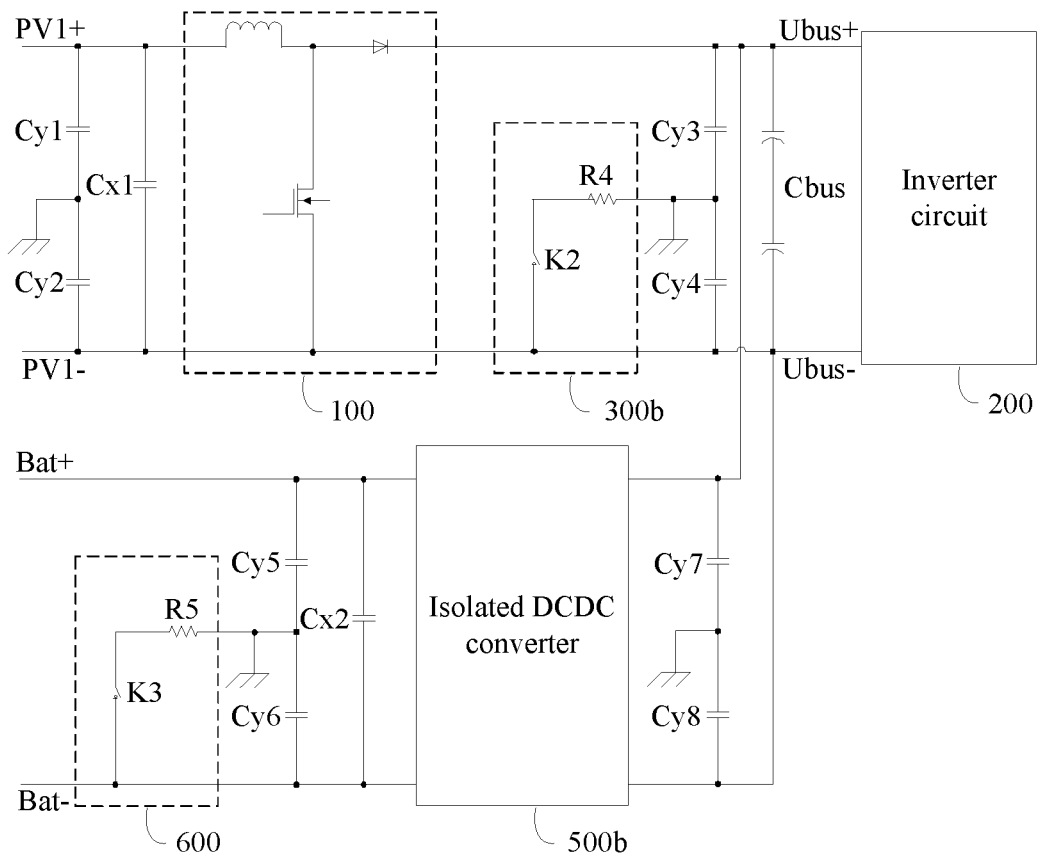
FIG. 7 is a circuit diagram of a photovoltaic inverter including an isolated DCDC converter in a common negative connection according to another embodiment of the present disclosure.

Reference is made to FIG. 7, which is a circuit diagram of a photovoltaic inverter including an isolated DCDC converter in a common negative connection according to an embodiment of the present disclosure. In this embodiment, the photovoltaic inverter includes a first discharging circuit 300b. The first discharging circuit 300b includes a fourth resistor R4 and a second controllable switch K2.

A first terminal of the fourth resistor R4 is connected to the common terminal of the second group of Y capacitors (Cy3 and Cy4). A second terminal of the fourth resistor R4 is connected to the negative input end of the inverter circuit 200 via the second controllable switch K2.

The controller 400 is configured to control the second controllable switch K2 to be closed, so that the first discharging circuit 300b operates.

It should be understood that in this embodiment, the connection between the third group of Y capacitors and the first discharging circuit 300a is cut off by the isolated DCDC converter 500b. The first discharging circuit 300b including the second resistor R2 and the first controllable switch K2 discharges the electrical energy of the first group of Y capacitors, the second group of Y capacitors, and the fourth group of Y capacitors. The second discharging circuit 600 including the fifth resistor R4 and the third controllable switch K2 discharges the electrical energy of the third group of Y capacitors.

In this embodiment, for the photovoltaic inverter including an isolated DCDC converter in a common negative connection, the first discharging circuit 300b discharges the electrical energy of the first group of Y capacitors, the second group of Y capacitors and the fourth group of Y capacitors, and the second discharging circuit 600 discharges the electrical energy of the third group of Y capacitors, without discharging the electrical energy of the direct current bus capacitor with a large capacitance. In this case, power of the discharging resistor is small, so that the volume of the discharging circuit is reduced, and the cost of the photovoltaic inverter is reduced.

In the following description, the first DCDC converter 100 and the inverter circuit 200 in the photovoltaic inverter are in common positive connection.

Figure 8:
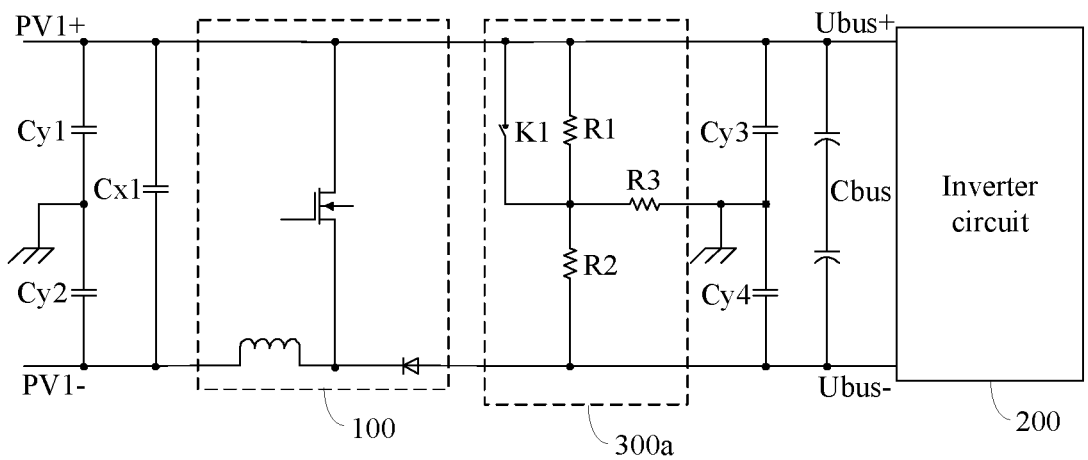
FIG. 8 is a circuit diagram of a photovoltaic inverter in a common positive connection according to an embodiment of the present disclosure.

Reference is made to FIG. 8, which is a circuit diagram of a photovoltaic inverter in a common positive connection according to an embodiment of the present disclosure.

In this embodiment, the first discharging circuit 300a is an insulation resistance detection circuit.

The insulation resistance detection circuit includes a first resistor R1, a second resistor R2, a third resistor R3, and a first controllable switch K1.

A first terminal of the first resistor R1 is connected to the positive input end of the inverter circuit 200. A second terminal of the first resistor R1 is connected to the negative input end of the inverter circuit 200 via the second resistor R2.

The first controllable switch K1 is connected in parallel with the first resistor R1.

A first terminal of the third resistor R3 is connected to the second terminal of the first resistor R1. A second terminal of the third resistor R3 is connected to a common terminal of a second group of Y capacitors (Cy3 and Cy4).

The controller 400 is configured to control the first controllable switch K1 to be closed, so that the insulation resistance detection circuit 300 discharges electrical energy of the first group of Y capacitors (Cy1 and Cy2).

In this embodiment, in order to reduce the voltage of the photovoltaic inverter in a common positive connection to a certain voltage within a certain time period, an insulation resistance detection circuit in the photovoltaic inverter doubles as a first discharging circuit 300a to discharge electrical energy of a Y capacitor whose capacitance is much smaller than that of the direct current bus capacitor, without an additional discharging circuit, thereby reducing the cost of the photovoltaic inverter.

Figure 9:
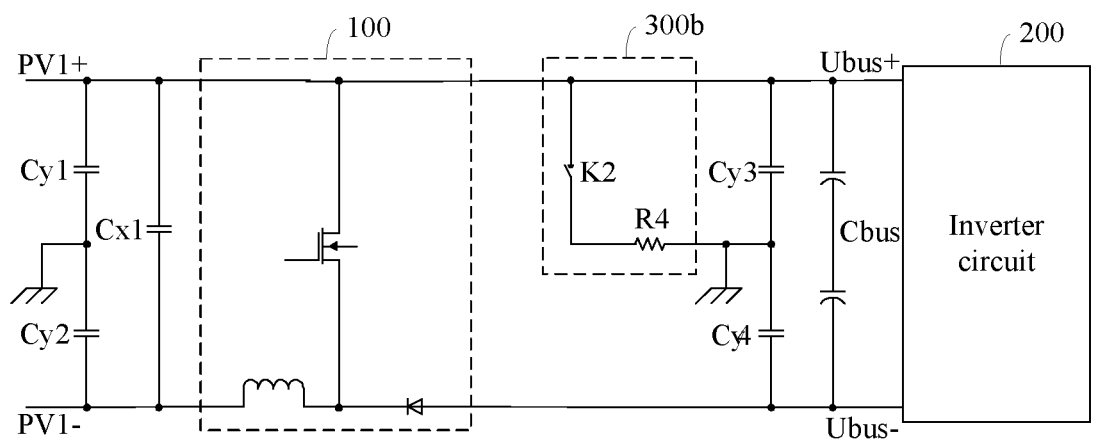
FIG. 9 is a circuit diagram of a photovoltaic inverter in a common positive connection according to another embodiment of the present disclosure.

In another embodiment, in the case that the first DCDC converter 100 and the inverter circuit 200 in the photovoltaic inverter are in common positive connection, the photovoltaic inverter includes a first discharging circuit 300b, as shown in FIG. 9.

Reference is made to FIG. 9, which is a circuit diagram of a photovoltaic inverter in a common positive connection according to an embodiment of the present disclosure.

In this embodiment, the photovoltaic inverter includes a first discharging circuit 300b. The first discharging circuit 300b includes a fourth resistor R4 and a second controllable switch K2.

A first terminal of the fourth resistor R4 is connected to a common terminal of a second group of Y capacitors (Cy3 and Cy4). A second terminal of the fourth resistor R4 is connected to the positive input end of the inverter circuit 200 via the second controllable switch K2.

The controller 400 is configured to control the second controllable switch K1 to be closed, so that the first discharging circuit 300b operates.

In this embodiment, in order to reduce the voltage of the photovoltaic inverter in a common positive connection to a certain voltage within a certain time period, a first discharging circuit 300b including the fourth resistor R4 and the second controllable switch K2 is added to discharge electrical energy of a Y capacitor with a small capacitance, without discharging the electrical energy of the direct current bus capacitor with a large capacitance. In this case, power of the discharging resistor is small, so that the volume of the discharging circuit is reduced, and the cost of the photovoltaic inverter is reduced.

Figure 10:
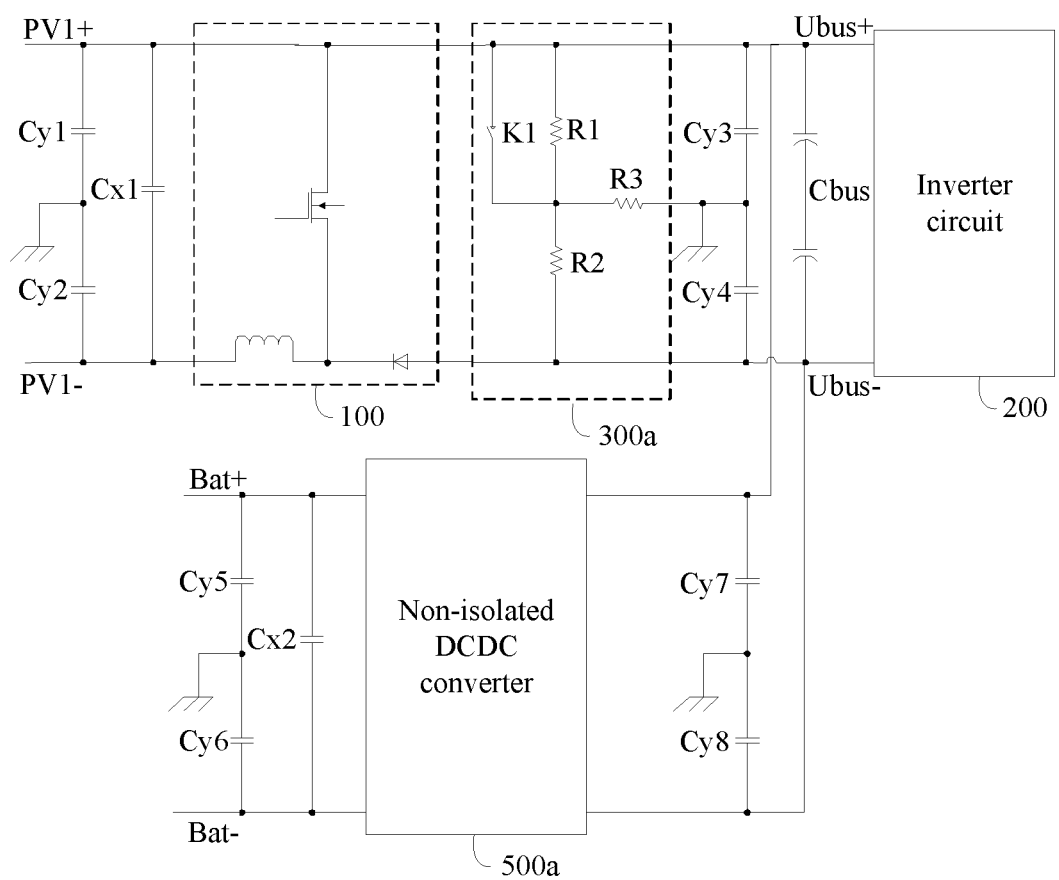
FIG. 10 is a circuit diagram of a photovoltaic inverter including a non-isolated DCDC converter in a common positive connection according to another embodiment of the present disclosure.

In another embodiment, in the case that the first DCDC converter 100 and the inverter circuit 200 in the photovoltaic inverter are in common positive connection, the photovoltaic inverter further includes a second DCDC converter 500a, as shown in FIG. 10. In practice, an input side (that is, a Bat port) of the second DCDC converter 500a is connected to a photovoltaic energy storage device, that is, a device for storing electrical energy in a photovoltaic system.

Reference is made to FIG. 10, which is a circuit diagram of a photovoltaic inverter including a non-isolated DCDC converter in a common positive connection according to another embodiment of the present disclosure.

Components added to the photovoltaic inverter shown in FIG. 10 relative to FIG. 8 are the same as those in FIG. 4.

In FIG. 4, the first DCDC converter 100 and the inverter circuit 200 are in common negative connection. However, the first DCDC converter 100 and the inverter circuit 200 are in common positive connection in FIG. 10.

In other embodiments, in the photovoltaic inverter shown in any one of the FIGS. 5, 6, and 7, the first DCDC converter 100 and the inverter circuit 200 are in common negative connection.

For the photovoltaic inverter in which the first DCDC converter 100 and the inverter circuit 200 are in common positive connection, a discharging circuit is the same as that in the photovoltaic inverter in which the first DCDC converter 100 and the inverter circuit 200 are in common negative connection. For differences from the photovoltaic inverter in which the first DCDC converter 100 and the inverter circuit 200 are in common negative connection, reference is made to FIGS. 9 and 10.

Based on the photovoltaic inverter according to the foregoing embodiments, a photovoltaic system is further provided according to an embodiment of the present disclosure.

Figure 11:
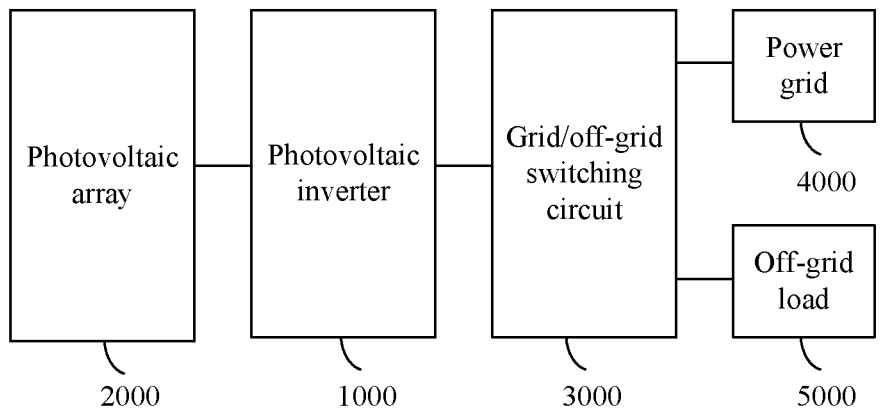
FIG. 11 is a block diagram of a photovoltaic system according to an embodiment of the present disclosure.

Reference is made to FIG. 11, which is a block diagram of a photovoltaic system according to an embodiment of the present disclosure.

The photovoltaic system includes the photovoltaic inverter and a photovoltaic array 2000.

An output side of the photovoltaic array 2000 is connected to an input side of a photovoltaic inverter 1000.

The photovoltaic inverter 1000 is configured to convert direct current electricity outputted by the photovoltaic array 2000 into alternating current electricity and output the alternating current electricity.

It should be understood that, the photovoltaic inverter 1000 converts the direct current electricity outputted by the photovoltaic array 2000 into alternating current electricity, and outputs the alternating current electricity to an grid/off-grid switching circuit 3000, so as to supply power to a power grid 4000 or an off-grid load 5000.

In this embodiment, when the photovoltaic inverter 1000 connected to the grid is required to be quickly shut down, a voltage across the photovoltaic inverter 1000 is rapidly decreased to below a specified voltage.

Based on the photovoltaic inverter and the photovoltaic system according to the foregoing embodiments, a method for controlling discharging is provided according to an embodiment of the present disclosure.

Figure 12:
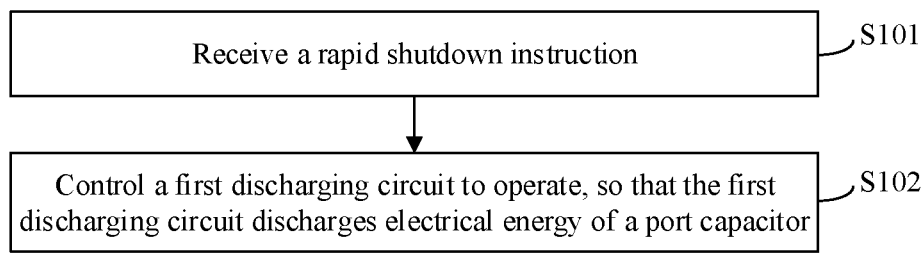
FIG. 12 is a flowchart of a method for controlling discharging according to an embodiment of the present disclosure.

Reference is made to FIG. 12, which is a flowchart of a method for controlling discharging according to an embodiment of the present disclosure. The method includes the following steps S101 to S102.

In step S101, a rapid shutdown instruction is received.

When receiving a rapid shutdown instruction (for example, an external instruction signal, and a grid shutdown signal), a controller 400 performs control operation for rapidly discharging electrical energy of a port capacitor.

In step S102, a first discharging circuit is controlled to operate, so that the first discharging circuit discharges electrical energy of the port capacitor.

The port capacitor includes an X capacitor and a first group of Y capacitors.

In an embodiment, for a Boost inverter, the method includes the following steps (1) to (2).

In step (1), electrical energy of the X capacitor of the port capacitor is discharged through a switch transistor of the Boost converter.

In step (2), as shown in FIG. 2 or 8, a switch in a first discharging circuit is closed, so that electrical energy of a Y capacitor is discharged through a resistor in an insulation resistance detection circuit. Alternatively, as shown in FIG. 3 or 9, a switch in a first discharging circuit is closed, so that electrical energy of a Y capacitor is discharged based on an equivalent resistance a discharging circuit for the Y capacitor.

In the embodiment of the present disclosure, the first discharging circuit discharges the electrical energy of the first group of Y capacitors. Capacitance of a Y capacitor is much smaller than that of a direct current bus capacitor. Time constant is proportional to RC, where R is resistance of a discharging resistor, and C is capacitance of a discharging capacitor. Therefore, for a certain time constant, small capacitance corresponds to a large resistance (of a fourth resistor R4). Further, a resistor with a large resistance has a small volume. Therefore, compared with the existing solution for discharging electrical energy of the direct current bus capacitor, a volume of the discharging circuit is reduced and cost of the photovoltaic system is reduced with the technical solutions in the present disclosure.

It should be noted that embodiments in this specification are described in a progressive manner. Each embodiment focuses on differences from other embodiments. The same and similar parts between embodiments are referred to each other. Since the system or device disclosed herein corresponds to the method, the description of the system or device is relatively simple, and relevant information is referred to the description of the method.

It should further be noted that, in some embodiments, the photovoltaic inverter includes both an insulation resistance detection circuit 300a and a first discharging circuit 300b. That is, the insulation resistance detection circuit 300a and the first discharging circuit 300b both discharge electrical energy of the Y capacitor, thereby speeding up discharging.

The first controllable switch K1, the second controllable switch K2, and the third controllable switch K3 mentioned in the embodiments in this specification are implemented by relays, semiconductor switches, and the like. The first discharging circuit 300 including the second controllable switch K2 and the fourth resistor R4, and the second discharging circuit 600 including the third controllable switch K3 and the fifth resistor R5 each is a switch with an internal resistance, such as a relay and a semiconductor switch.

As mentioned above, the above embodiments are only for illustrating rather than limiting the technical solutions of the present disclosure. Although the present disclosure is described in detail with reference to the embodiments, those skilled in the art may still modify the technical solutions, or equivalently replace some of the technical features in the technical solutions. These modifications or replacements do not cause the essence of the corresponding technical solutions to deviate from the spirit and scope of the technical solutions of the embodiments of the present disclosure.

The invention claimed is:

1. A photovoltaic inverter, comprising:
   a first direct current to direct current (DCDC) converter;
   an inverter circuit;
   a first discharging circuit; and
   a controller, wherein
   the first DCDC converter is connected to a photovoltaic array at an input side of the first DCDC converter, and is connected to an input side of the inverter circuit at an output side of the first DCDC converter;
   a port capacitor is connected between a positive input end and a negative input end of the first DCDC converter, wherein the port capacitor comprises an X capacitor and a first group of Y capacitors;
   the first discharging circuit is connected between a common terminal of the first group of Y capacitors and a direct current bus, wherein the common terminal of the first group of Y capacitors is grounded;
   the controller is configured to control, when receiving a rapid shutdown instruction, the first discharging circuit to operate; and
   the first discharging circuit is configured to discharge electrical energy of the port capacitor; wherein the first DCDC converter and the inverter circuit are in a common negative connection; a second group of Y capacitors are connected between a positive input end and a negative input end of the inverter circuit, wherein a common terminal of the second group of Y capacitors is grounded; and the first discharging circuit is further configured to discharge electrical energy of the second group of Y capacitors, wherein the first discharging circuit comprises an insulation resistance detection circuit.

2. The photovoltaic inverter according to claim 1, wherein the insulation resistance detection circuit is connected between the common terminal of the second group of Y capacitors and the direct current bus, and the insulation resistance detection circuit comprises a first resistor, a second resistor, a third resistor, and a first controllable switch, wherein
   a first terminal of the first resistor is connected to the positive input end of the inverter circuit, and a second terminal of the first resistor is connected to the negative input end of the inverter circuit via the second resistor;
   a first terminal of the second resistor is connected to the second terminal of the first resistor, and a second terminal of the second resistor is connected to the negative input end of the inverter circuit;
   a first terminal of the third resistor is connected to the second terminal of the first resistor, and a second terminal of the third resistor is connected to the common terminal of the second group of Y capacitors; and
   the controller is configured to control the first controllable switch to be closed to activate the insulation resistance detection circuit to discharge electrical energy of the first group of Y capacitors and the second group of Y capacitors.

3. The photovoltaic inverter according to claim 2, wherein the first discharging circuit further comprises a branch comprising a fourth resistor and a second controllable switch, wherein
   a first terminal of the fourth resistor is connected to the common terminal of the second group of Y capacitors, and a second terminal of the fourth resistor is connected to the negative input end of the inverter circuit via the second controllable switch; and
   the controller is further configured to control the second controllable switch to be closed to activate the branch.

4. The photovoltaic inverter according to claim 1, wherein the first discharging circuit comprises a fourth resistor and a second controllable switch, wherein
   a first terminal of the fourth resistor is connected to the common terminal of the second group of Y capacitors, and a second terminal of the fourth resistor is connected to the negative input end of the inverter circuit via the second controllable switch; and
   the controller is configured to control the second controllable switch to be closed to activate the first discharging circuit.

5. The photovoltaic inverter according to claim 1, further comprising: a second DCDC converter, wherein the second DCDC converter is a non-isolated DCDC converter;

a third group of Y capacitors is connected between a positive input end and a negative input end of the second DCDC converter, and a common terminal of the third group of Y capacitors is grounded;

a fourth group of Y capacitors is connected between a positive output end and a negative output end of the second DCDC converter, and a common terminal of the fourth group of Y capacitors is grounded;

the positive output end of the second DCDC converter is connected to the positive input end of the inverter circuit, and the negative output end of the second DCDC converter is connected to the negative input end of the inverter circuit; and the first discharging circuit is further configured to discharge electrical energy of the third group of Y capacitors and the fourth group of Y capacitors.

6. The photovoltaic inverter according to claim 1, further comprising: a second DCDC converter and a second discharging circuit, wherein the second DCDC converter is an isolated DCDC converter;

a third group of Y capacitors is connected between a positive input end and a negative input end of the second DCDC converter, and a common terminal of the third group of Y capacitors is grounded;

a fourth group of Y capacitors is connected between a positive output end and a negative output end of the second DCDC converter, and a common terminal of the fourth group of Y capacitors is grounded;

the positive output end of the second DCDC converter is connected to the positive input end of the inverter circuit, and the negative output end of the second DCDC converter is connected to the negative input end of the inverter circuit;

the second discharging circuit is connected between the common terminal of the third group of Y capacitors and the negative input end of the second DCDC converter; and the controller is further configured to control, when receiving the rapid shutdown instruction, the second discharging circuit to operate, so as to discharge electrical energy of the third group of Y capacitors.

7. The photovoltaic inverter according to claim 1, wherein the first DCDC converter and the inverter circuit are in a common positive connection;

a second group of Y capacitors are connected between a positive input end and a negative input end of the inverter circuit, wherein a common terminal of the second group of Y capacitors is grounded; and the first discharging circuit is further configured to discharge electrical energy of the second group of Y capacitors.

8. The photovoltaic inverter according to claim 7, wherein the first discharging circuit comprises an insulation resistance detection circuit.

9. The photovoltaic inverter according to claim 8, wherein the insulation resistance detection circuit comprises a first resistor, a second resistor, a third resistor, and a first controllable switch, wherein a first terminal of the first resistor is connected to the positive input end of the inverter circuit, and a second terminal of the first resistor is connected to the negative input end of the inverter circuit via the second resistor;

the first controllable switch is connected in parallel with the first resistor;

a first terminal of the third resistor is connected to the second terminal of the first resistor, and a second terminal of the third resistor is connected to the common terminal of the second group of Y capacitors; and the controller is configured to control the first controllable switch to be closed to activate the insulation resistance detection circuit to discharge electrical energy of the first group of Y capacitors and the second group of Y capacitors.

10. The photovoltaic inverter according to claim 9, wherein the first discharging circuit further comprises a branch comprising a fourth resistor and a second controllable switch, wherein a first terminal of the fourth resistor is connected to the common terminal of the second group of Y capacitors, and a second terminal of the fourth resistor is connected to the negative input end of the inverter circuit via the second controllable switch; and the controller is further configured to control the second controllable switch to be closed to activate the branch.

11. The photovoltaic inverter according to claim 7, wherein the first discharging circuit comprises a fourth resistor and a second controllable switch, wherein a first terminal of the fourth resistor is connected to the common terminal of the second group of Y capacitors, and a second terminal of the fourth resistor is connected to the negative input end of the inverter circuit via the second controllable switch; and the controller is configured to control the second controllable switch to be closed to activate the first discharging circuit.

12. The photovoltaic inverter according to claim 7, further comprising: a second DCDC converter, wherein the second DCDC converter is a non-isolated DCDC converter;

a third group of Y capacitors is connected between a positive input end and a negative input end of the second DCDC converter, and a common terminal of the third group of Y capacitors is grounded;

a fourth group of Y capacitors is connected between a positive output end and a negative output end of the second DCDC converter, and a common terminal of the fourth group of Y capacitors is grounded;

the positive output end of the second DCDC converter is connected to the positive input end of the inverter circuit, and the negative output end of the second DCDC converter is connected to the negative input end of the inverter circuit; and the first discharging circuit is further configured to discharge electrical energy of the third group of Y capacitors and the fourth group of Y capacitors.

13. The photovoltaic inverter according to claim 7, further comprising: a second DCDC converter and a second discharging circuit, wherein the second DCDC converter is an isolated DCDC converter;

a third group of Y capacitors is connected between a positive input end and a negative input end of the second DCDC converter, and a common terminal of the third group of Y capacitors is grounded;

a fourth group of Y capacitors is connected between a positive output end and a negative output end of the second DCDC converter, and a common terminal of the fourth group of Y capacitors is grounded;

the positive output end of the second DCDC converter is connected to the positive input end of the inverter circuit, and the negative output end of the second DCDC converter is connected to the negative input end of the inverter circuit;

the second discharging circuit is connected between the common terminal of the third group of Y capacitors and the negative input end of the second DCDC converter; and the controller is further configured to control, when receiving the rapid shutdown instruction, the second discharging circuit to operate, so as to discharge electrical energy of the third group of Y capacitors.

14. A photovoltaic system, comprising:

the photovoltaic inverter according to claim 1; and a photovoltaic array, wherein the photovoltaic inverter is connected to an output side of the photovoltaic array at an input side of the photovoltaic inverter; and the photovoltaic inverter is configured to convert direct current electricity outputted by the photovoltaic array into alternating current electricity and output the alternating current electricity.

15. A method for controlling discharging, wherein the method is performed by the photovoltaic inverter according to claim 1; and the method comprises:

controlling, when receiving a rapid shutdown instruction, the first discharging circuit to operate to discharge electrical energy of the port capacitor.

\* \* \* \* \*